United States Patent [19]

Himeno

[11] Patent Number: 4,726,028
[45] Date of Patent: Feb. 16, 1988

[54] METHOD FOR ERROR DETECTION AND ERROR CORRECTION

[75] Inventor: Takuji Himeno, Chiba, Japan
[73] Assignee: Sony Corporation, Tokyo, Japan
[21] Appl. No.: 839,348
[22] Filed: Mar. 13, 1986
[30] Foreign Application Priority Data Mar. 13, 1985 [JP] Japan ............................. 60-050136

[51] Int. Cl.⁴ .............................................. G06F 11/10
[52] U.S. Cl. ................................................. 371/37
[58] Field of Search ..................... 371/37, 38, 39, 40

[56] References Cited

U.S. PATENT DOCUMENTS

| | | | |
|---|---|---|---|
| 4,330,860 | 5/1982 | Wada | 371/37 |
| 4,541,092 | 9/1985 | Sako | 371/39 |
| 4,569,051 | 2/1986 | Wilkinson | 371/37 |
| 4,593,395 | 6/1986 | Schouhamer | 371/40 |
| 4,630,272 | 12/1986 | Fukami | 371/37 |

Primary Examiner—Jerry Smith
Assistant Examiner—Robert W. Beausoliel, Jr.
Attorney, Agent, or Firm—Hill, Van Santen, Steadman & Simpson

[57] ABSTRACT

An improved method for detecting and correcting error words in a data block formed of a plurality of words each consisting of a predetermined number of bits of digital signal and including in the block first error check words, second error check words not completely coincident with the first words, and a third error check word, comprising the steps of first executing an error check by the third check word and concluding that an error is in each of the words of the data block when an error is detected, executing second and third error checks by the respective first and second error check words and thereupon setting one of three states namely a state in which each of the words is correct, a state in which each of the words has an error and a state in which it is yet undetermined whether each word is correct or has an error; and when words having errors or undetermined words are included in the first and second words series, changing the state of the words having errors or the undetermined words.

6 Claims, 19 Drawing Figures

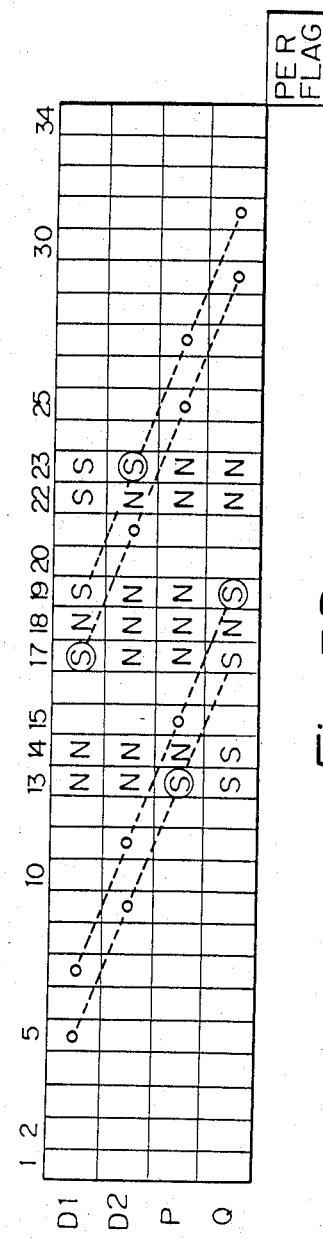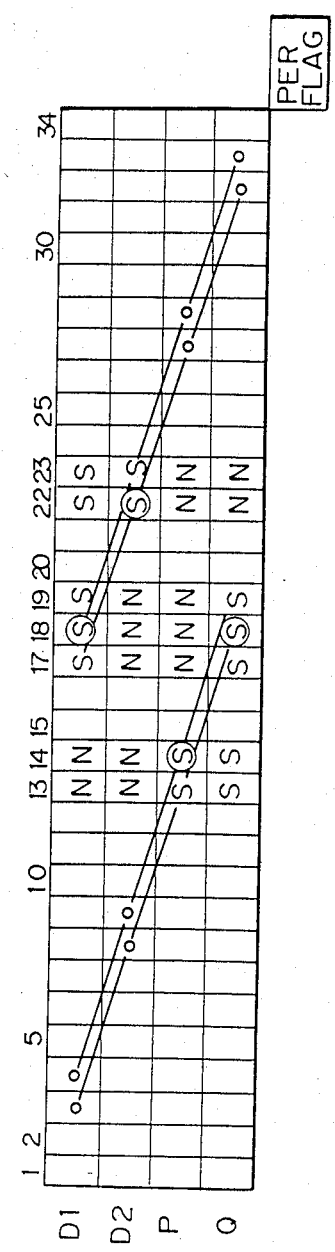

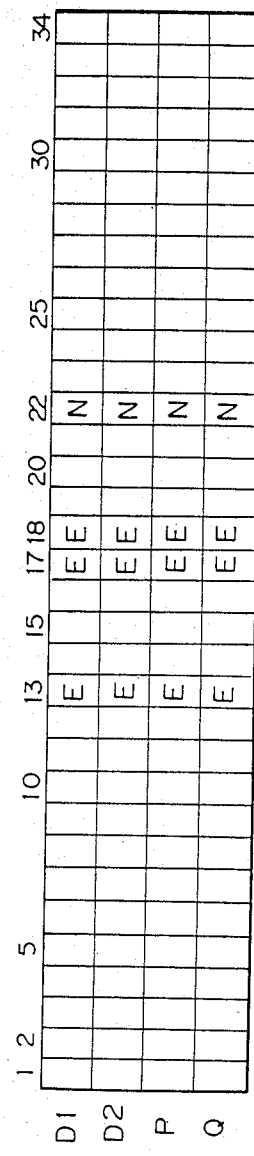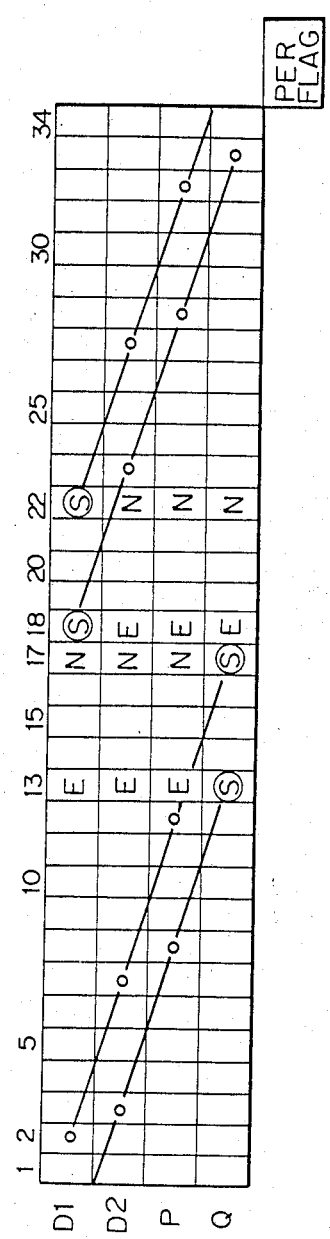

METHOD FOR ERROR DETECTION AND ERROR CORRECTION

FIELD OF THE INVENTION AND RELATED ART STATEMENT

The present invention relates to a method for error detection and error correction whereby a possible code error which may be generated when a digital signal is transmitted through a transmission path, for example, in a recording/reproducing apparatus or the like is detected and further corrected.

In the case of recording a digital audio signal on a magnetic tape, what is called a cross-interleaving technique, in which a time sequence of the digital audio signal is interchanged and first and second parities are sequentially added to a predetermined number of series of those interchanged data, is, for example, used.

There is also the case where an error check code, e.g., a CRC code is added to every predetermined number of series of those data obtained by applying the cross-interleaving technique.

To correct errors of the data reproduced from the magnetic tape, a check is first made using an error check code to see if an error is detected in the data or not. The result of this check is added as a flag to each data and stored into a memory (RAM). The error correcting process is executed with reference to this flag.

When data is decoded, in the case where, for example, the magnetic tape which has once been used is again used to record new data, some prerecorded data can be sometimes reproduced since the previous data is not completely erased. Even if the CRC check is performed with respect to such a remaining data, no error cannot be detected.

There is also a small probability that it is impossible to detect an error by the CRC code in dependence on an error generation pattern. Therefore, there is some data which is processed as no-error data in spite of the fact that it actually contains some errors. Such data whose errors were not detected is reproduced as an abnormal sound when a signal is reproduced, causing a problem such that the reproduced sound quality deteriorates to an extreme extent.

To solve such a problem, applicant of this application has proposed the following method in International application of International publication No. Wo85/00065, which has been internationally published on Jan. 3, 1985.

Namely, in this international application, as the result of the parity check by use of not only the CRC code but also two error correction code series (called P series and Q series) due to the cross-interleaving, when parity errors are detected in the respective P and Q series or when a parity error is detected in one of the P and Q series and a CRC error is detected in the other series, a check of the word becomes impossible and this word is determined to be the word having a parity error in such a case. On the contrary, when no parity error is detected in at least one of the P and Q series, this word is decided to be the correct word.

The data block having a parity error is specified using the result of the above-mentioned discrimination about the parity error. The following two methods of setting and error pointer have been proposed in the above international application.

(1) When at least one word which was determined to have a parity error exists in the data block, a pointer indicative of an error is set to all words in this data block.

(2) When one or more words which were determined to have parity errors exist in the data block and also the word which was decided to be correct doesn't exist in this data block, a pointer representative of an error is set to all words in this data block.

However, according to the first method, if at least one word which was determined to have a parity error exists in the data block, all words in this data block are determined to be the erroneous words. Therefore, in spite of the fact that correct words exist in the data block, the pointer indicative of an error is set. Thus, the words which were considered to have an error in spite of the fact that they actually have no error, are subjected to an error correcting process. If the corrected word, which was erroneously determined to have an error, is not corrected due to the error correcting process, this word will be interpolated by the mean value of the basis of the words located before and after this correct word with respect to the time, or the word located just before this correct word with regard to the time will be held in place of this correct word. Consequently, there is a risk of deterioration of sound quality.

On the other hand, the use of the second method can prevent the situation that the correct words existing in the data block having a parity error are unnecessarily and erroneously handled as erroneous words. Therefore, the second method is better than the first method.

However, if one word existing in the data block having a parity error is the word which remained on the magnetic tape without being erased and also incidentally coincides with the inherent no-error word overwritten on this magnetic tape, or in the case where two or more parity errors are generated in the P or Q series and these parity errors are not incidentally detected when the parity check of this series was performed, the result of the parity check of this series is considered to have no error.

Therefore, according to the second method, the pointer representative of an error is not set to this data block and the parity error is overlooked. Further, if the correction is repeated using the word whose parity error was overlooked, the erroneous correction will be increased and an abnormal sound will be generated.

As described above, in the case where the overlooking of an error due to an incidental coincidence occurs, it is preferable to use the first method to prevent the generation of an abnormal sound.

In the first method, there is the case where the correct word is regarded as an erroneous word and if this word is not determined to be correct due to the error correcting process, it is subjected to an interpolating process or a previous word value holding process, so that a sound quality deteriorates. Therefore, when the overloooking of an error due to the incidental coincidence doesn't occur, it is desirable to use the second method. However, the occurrence of the overlooking due to the incidental coincidence can be detected only when the error correction is executed; therefore, it is impossible to previously select either the first or second method before execution of the error correction.

In addition, if the error correction is first performed by the second method and the overlooking of an error is detected during error correction, the results of the error correction so far are all invalidated, and then the error correction may be again executed using the first method. However, with such a method, the processing time taken for the error correction due to the second method becomes in vain, resulting in the reduction in time for the error correcting process. For example, this decreases the number of repetition times when the error correction is carried out by alternately repeating the P and Q series and causes a problem of a remarkable deterioration of the correcting capability.

OBJECT AND SUMMARY OF THE INVENTION

The present invention, therefore, intends to eliminate the problems in the above-mentioned first and second error correcting methods.

It is an object of the invention to increase an error correcting capability by minimizing the number of mistakes where the correct words are regarded as erroneous words.

Another object of the invention is to certainly detect and correct the words having errors.

Still another object of the invention is to provide an error correcting method having an excellent error correcting capability with respect to the processing time which is required for error correction.

To accomplish these objects, according to the invention, in addition to the word having an error and the correct word, a word which doesn't belong to both of those words, namely, a word of which the presence or absence of an error is not yet determined, is used, thereby discriminating whether the word is the word having an error or the correct word during execution of the error correcting process.

The above and other objects, features and advantages of the present invention will be more apparent from the following detailed description in conjunction with the accompanying drawings.

BRIEF DESCRIPTION OF THE DRAWINGS

FIGS. 5A to 5D are diagrams showing the states of pointers when the invention is applied to a flag map shown in FIG. 4;

FIGS. 8A to 8C are diagrams showing the states of pointers when the invention is applied to the flag map shown in FIG. 7.

DETAILED DESCRIPTION OF THE PREFERRED EMBODIMENTS

An embodiment of the present invention will now be described hereinbelow with reference to the drawings.

In this embodiment, the invention is applied to the error detection and error correction in the case where digital audio signals wherein one word is constituted by sixteen bits are recorded on a magnetic tape by, e.g. rotary heads and the recorded digital audio signals are reproduced from the magnetic tape. However, the invention is not limited to the magnetic recording and reproduction but may be also generally applied to errors which are generated when a signal is transmitted through a transmission path.

(A) Code Block Arrangement

Figure 1:
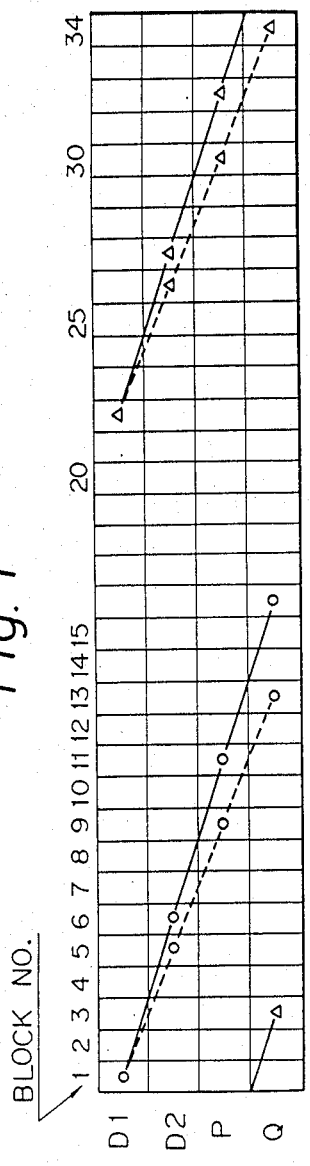
FIG. 1 is a block diagram of the codes which are two-dimensionally arranged for convenience for explaining a code arrangement of an embodiment of the present invention.

FIG. 1 shows an arrangement of a code block of error correction codes of an embodiment. One code block is constituted by total thirty-four data blocks in which one data block consists of four words (digital audio data consists of two words of $D_1$ and $D_2$ and parities consist of two words of P and Q). The cross-interleaving is performed so as to be completed within this code block.

The P series, which is used to carry out the error detection or error correction, is obtained by performing, for example, a simple parity coding process to total three words consisting of the words $D_1$ and $D_2$ and parity Q which are included in the data blocks which are selected for every five data blocks as shown by solid lines in FIG. 1. On the other hand, the Q series is derived by performing, e.g., a simple parity coding process to total three words consisting of the words $D_1$ and $D_2$ and parity P which are included in the data blocks which are selected for every four data blocks as indicated by broken lines. Namely, this embodiment is of the feedback type in which when the parity of one of the P and Q series is formed, the parity of the other series is included.

$$D_1[+]D_2[+]Q=P, \quad D_1[+]D_2[+]P=Q$$

([+] denotes the addition of (mod. 2),)

Due to this coding process, each of (2×34) words included in the code blocks is included in the P and Q series, which are mutally different combinations.

Figure 2:
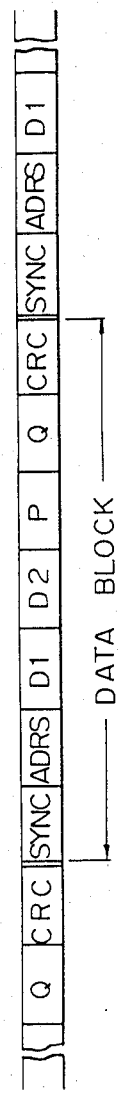
FIG. 2 is a data arrangement diagram in the case where the words shown in FIG. 1 are recorded on a magnetic tape.

In addition, the coding process may be also carried out by what is called a non-feedback type in which the parity Q is not included in the P series. As shown in FIG. 2, the respective words derived due to this coding process are sequentially recorded on the magnetic tape by the rotary heads after a block synchronization signal and a block address were added to each data block and a CRC code for error check was added to the block address and words $D_1$ and $D_2$ and parities P and Q as shown in FIG. 2.

The words reproduced from the magnetic tape are subjected to the error checking process by the CRC code and then written into the RAM. The reproduced words of one code block written in the RAM are parity checked with respect to each series. In the RAM, the data of one word has a constitution as shown in FIG. 3.

Figure 3:
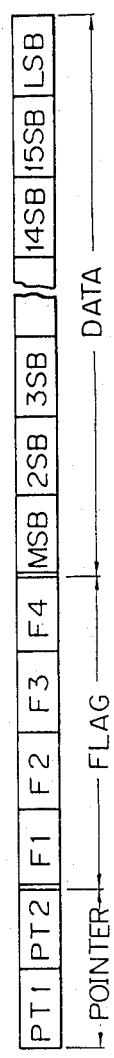
FIG. 3 is a diagram showing a data arrangement of each word which is explained in this embodiment.

In FIG. 3, flags ($F_1$, $F_2$, $F_3$, $F_4$,) of four bits and pointers ($PT_1$, $PT_2$) of two bits are added to the data of sixteen bits (from the most significant bit MSB to the least significant bit LSB). The flags ($F_1$, $F_2$) are used for parity check of the P series. The flags ($F_3$, $F_4$) are used for parity check of the Q series.

(B) Error detection and converting process from the flags to the pointers

[1] The flags ($F_1$ to $F_4$) of four bits provided for each word are preset to (1111).

[2] When an error is detected as the result of the execution of the CRC check with respect to each data block, the flags ($F_1$, $F_2$, $F_3$, $F_4$) added to each word in this data block are set to (0101).

[3] A flag indicative of the presence or absence of a parity error (hereinafter, this flag is referred to as a PER flag) is provided for each code block and is set to "0".

[4] In the case where the parity check of the P series is performed and no CRC error word exists in this series, if a parity error is detected, the flags ($F_1$, $F_2$,) of the respective words of this series are set to (10) and the PER flag is further set to "1". If no parity error is detected, the flags ($F_1$, $F_2$) are set to "00".

[5] With respect to the Q series as well, the processes similar to the above are executed for the flags ($F_3$, $F_4$) and PER flag.

When a parity error is detected at least once as the result of the above processes, the PER flag is set to "1". When the parity check is performed with respect to each of the P and Q series, if at least one or more words having CRC errors are included in these series, the flags of all words excluding the words having the CRC errors of those series are held to (01). Namely, the word having the flags of (01) indicates that the parity check could not be executed. No process is performed with regard to the PER flag.

[6] The words when parity errors were detected in both P and Q series or when a parity error was detected in one of the P and Q series and the parity check couldn't be performed with regard to the other series, namely, the words of which the flags ($F_1$, $F_2$, $F_3$, $F_4$) are (1010), (1001), and (0110) are determined to be the words having parity error.

On the other hand, the words when a parity error wasn't detected in at least one of the P and Q series, namely, the words in which the flags ($F_1$, $F_2$, $F_3$, $F_4$) are (0000), (0001), (0010), (0100), and (1000) are decided to be the correct words.

The flags of each word are set due to the above-mentioned series of processes. The pointers consisting of two bits of $PT_1$ and $PT_2$ provided for each word instruct either one of the states in which the words are correct (this state is referred to as S), the state in which the words are wrong (this state is referred to as E), and the state in that it is not determined yet whether the words have errors or no error (this state is referred to as N) by reference to the flags of the respective words which are included in each data block.

[7] The flags of each word in the data block are checked. When a CRC error is detected, the flags of all words in this data block are (1111) and in such a case, E is set to the pointers of all words in this data block. In the case where no CRC error is detected in the respective words in the data block, and also if the word which was determined to have a parity error doesn't exist in the data block, S is set to the pointers of all words in this data block.

In the case where no CRC error is detected in the respective words in the data block, and also if the word which was determined to have a parity error doesn't exist in the data block, S is set to the pointers of all words in this data block.

When at least one or more words which were determined to have parity errors exist in the data block, and also when no correct word exists in this data block, E is set the pointer of all words in this data block and at the same time the PER flag is set to "0".

When at least one or more words of the data block were determined to have parity errors, and also if at least one or more words of this data block were decided to be correct, N is set to the pointers of all words in this data block.

By performing those processes, the pointers N are assigned to such respective words in the data block that has a possibility such that a parity error can be overlooked due to the incidental coincidence or due to correct words being erroneously regarded as words having parity errors.

According to the first error detecting method which has previously been proposed, if at least one word which was determined to have a parity error exists, all words in the data block containing this error word are regarded as words having errors; therefore, the pointers N in this invention are handled as the points E. According to the second error detecting method previously proposed, when at least one or more words having parity errors exist and also the word which was determined to be correct doesn't exist, all words in the data block are regarded as words having errors; therefore, the pointers N in this invention are handled as the pointers S.

However, according to this invention, it is not determined whether the pointers N are set to E or S but the subsequent correcting process is executed in this state.

In this stage, the state in which the PER flag is "1" denotes that a parity error is detected (processes [4] [5]) and the data block in which the pointers are E (process [7]) doesn't exist and it is finally determined that the pointers N are handled as the pointers E.

(C) Correcting process using the pointers

[8] The pointers of each word are examined with respect to the P or Q series and the parity check which will be explained hereinafter is performed and also the error correction which will be explained later is carried out.

In the case where a parity error is detected in the series consisting of the pointers of only S and N and including no pointer E, it is considered that a parity error has actually occurred in the words of the pointers N, so that the PER flag is set to "1".

On the other hand, when no parity error is detected in the series consisting of the pointers of only S and N and including no pointer E, it is considered that only the words having the pointer N are correct or the overlooking of a parity error due to the incidental coincidence has occurred in the words having the pointers N, so that no process is performed for the PER flag at this stage. Namely, the PER flag denotes that that a parity error was detected in the series having the pointers of only S and N one or more times during the correcting process. Therefore, in the case where the PER flag is "1" at the end of the error correction, all words having the pointers in the code block are handled as the words having the pointers E. When the PER flag is 37 0", all words having the pointers N are handled as the words having the pointers S.

The error correction is carried out in accordance with the following method.

(1) In the case of the words having the pointers E which were corrected by the series consisting of the words including no pointer N, namely, by the series containing one word having the pointers E and the three words having the pointers S, those pointers are changed to S.

(2) In the case of the words having the pointers N which were corrected by the series including no pointer E, namely, by the series containing one word having the pointer N and three words having the pointers S, those pointers are also changed to S.

This method is effective when the pointers N are handled as the pointers E. In the case where only one word having the pointers N exists among the words having the pointers S, if this word is determined to be the correct word as the result of the parity check, only this word having the pointers N is the correct word. Therefore, the pointers are changed from N to S. On the other hand, when a parity error is detected by the parity check, a parity error has occurred in the word having the pointers N. Thus, the PER flag is set to "1" and at the same time the word having the pointers N is corrected since only one word having the pointers N exists. Then, the pointers are changed from N to S.

(3) In the case of the words having the pointers E which were corrected by the series consisting of the words which include at least one or more pointers N, for example, by the series containing two pointers N, one pointer S, and one pointer E, the pointer E is changed to N.

This method is effective when the pointers N are handled as the pointers S. In the case of the series which has the pointers S and in which only one pointer E exists in one or more pointers N, the word having the pointer E is corrected by the remaining words having the pointers N and S and the pointer E is changed to N. Due to this, in the case where the pointer N is actually the pointer S, this word is accurately corrected. When the pointer N is actually the pointer E, this word is handled as the word having an error. Consequently, the miscorrection can be prevented.

(4) Although not the error correction, in the case where a parity error is detected in the series consisting of the words including two or more pointers n but no pointer E, it is considered that a parity error has occurrred in the words having at least one or more pointers N among them. Therefore, the PER flag is set to "1". When no parity error is detected, no process is executed and the PER flag is unchanged.

The above-mentioned correcting methods will be summarized in the following table.

| Number of pointers | | | Parity | PER | Correcting process | |
|---|---|---|---|---|---|---|
| E | N | S | check | flag | Data | Pointer |
| 0 | 0 | x | x | / | / | / |
| 0 | 1 | x | No error | / | / | N→S |
| 0 | 1 | x | Error | Set | Correct N | N→S |
| 0 | 2> | x | No error | / | / | / |
| 0 | 2> | x | Error | Set | / | / |
| 1 | 0 | x | X | / | Correct E | E→S |
| 1 | 1> | x | x | / | Correct E | E→N |
| 2> | x | x | x | / | / | / |

In the above table, 2> denotes two or more, x indicates that no relation, and/means that no process is performed.

The above processes are executed with respect to all series of the respective P and Q series and these processes are repeatedly carried out with regard to the P and Q series.

(D) Conversion from the pointers N to the pointers S or E

[9] When the PER flag is "1" at the end of the error correction, it is decided to handle the pointers of all words having the pointers N in the code block as the pointers E. When the PER flag is "0", it is determined to handle the pointers N of the words as the pointers S, similarly to the above.

[10] The pointers are checked with respect to all words excluding the parity words of P and Q. In the case of the words having the pointers N, the pointers N are changed to the pointers E or S.

[11] After completion of the above processes with respect to one code block shown in FIG. 1, the procedure advances to the next code block and the processes are executed in a manner similar to the above.

(E) Modification of the invention

As the result of the parity check in the foregoing processes of [4] and [5], if no parity error is detected at all and the PER flag is held to "0" (most cases come within this case), the correction is performed by an ordinary method without executing the process of [6] and the subsequent processes. Due to this, the time necessary for the processes of [7] and [10] can be used for the error correcting process and the number of repetition times of the error correction increases, so that the correcting capability can be improved. However, in this case, it is necessary to slightly increase the memory capacity of the ROM of the software for the correction by way of an ordinary method and to slightly increase the hardware for the branching process.

In the above case, if only one word having a CRC error exists in the P or Q series when the parity check is carried out in the processes of [4] and [5] to further increase the number of correction times, this word may be corrected and the flags ($F_1$, $F_2$, $F_3$, $F_4$) may be rewritten to other pattern such as (1100) or the like which is not used. When a parity error is detected, there is a possibility of miscorrection. Therefore, to invalidate such miscorrection, the flags (1100) are also handled as the case where there is a CRC error in the process of [7]. On the contrary, if no parity error is detected, the words are handled as the correct words.

Although four bits were provided as the flags and two bits were provided as the pointers for each word, respectively, these flags and pointers are not simultaneously used. Therefore, the memory capacity needed may be reduced by commonly using four bits for the flags as the bits indicative of the pointers.

Further, with regard to the pointers N representing that it is not determined whether the words have errors or are correct, a plurality pointers $N_1$ to $N_m$ may be used in correspondence to a degree of possibility of errors.

It is possible to use other code than the simple parity as the error correction code. For example, an error correction code such as Reed Solomon code, b-adjacent code, or the like, may be used. An error correction code which can correct two or more words may be also used.

Figure 4:
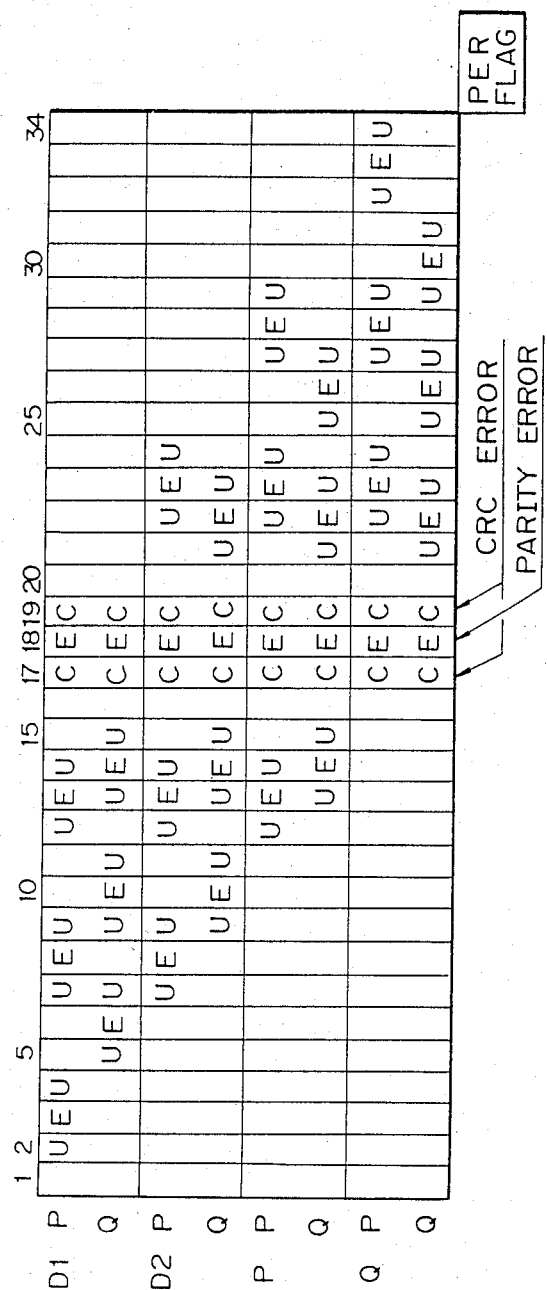
FIG. 4 is a diagram showing the states of flags for use in explanation of the invention.
Figure 7:
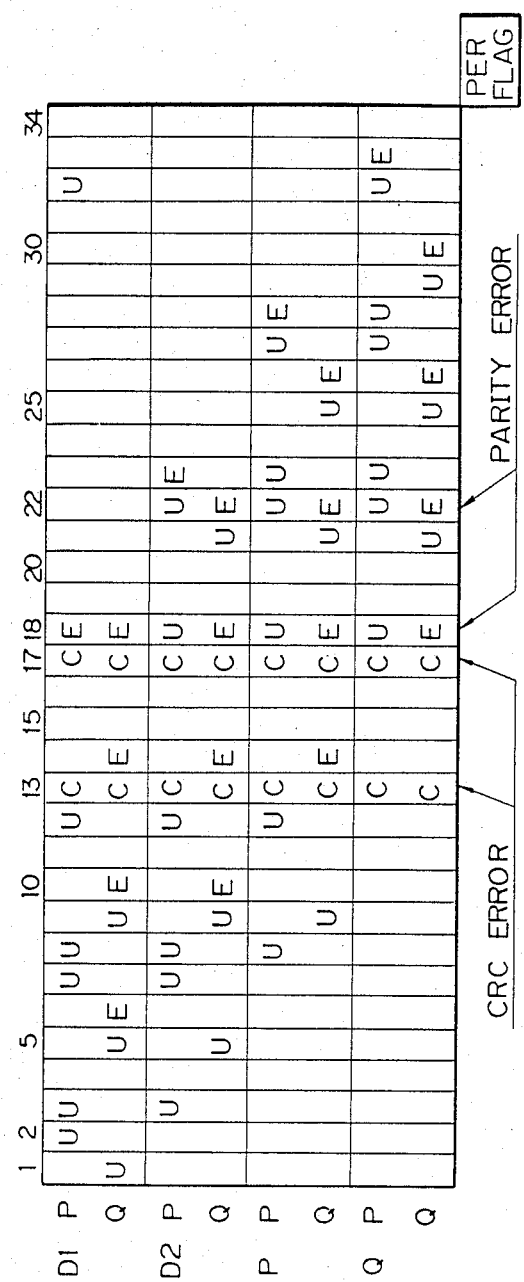
FIG. 7 is a diagram showing an example of another flag map for use in explanation of the invention.

FIGS. 4 and 7 show examples of flag maps of the code block having errors and the difference between the present invention and the conventional technology will then be explained.

FIG. 4 shows an example of the flag map useful for explaining the invention. It is assumed that one code block consists of (4×32) words and four flag bits consisting of the flags ($F_1$, $F_2$) for the P series and the flags ($F_3$, $F_4$) for the Q series are added to each word. In FIG. 4, a reference symbol written at the upper position of each word denotes the states of the flags ($F_1$, $F_2$) and a reference symbol written at the lower position likewise indicates the states of the flags ($F_3$, $F_4$). The symbols written in FIGS. 4 and 7 have the following meanings.

Blank←Flags (00): Correct
U←Flags (01): Parity check is impossible.
E←Flags (10): A parity error is detected.
C←Flags (11): A CRC check error is detected.

In this example, CRC errors are detected in the 17th and 19th data blocks and a parity error is detected in the 18th data block. The flag map shown in FIG. 4 can be obtained by executing the processes of [1] to [5].

Figure 5A:
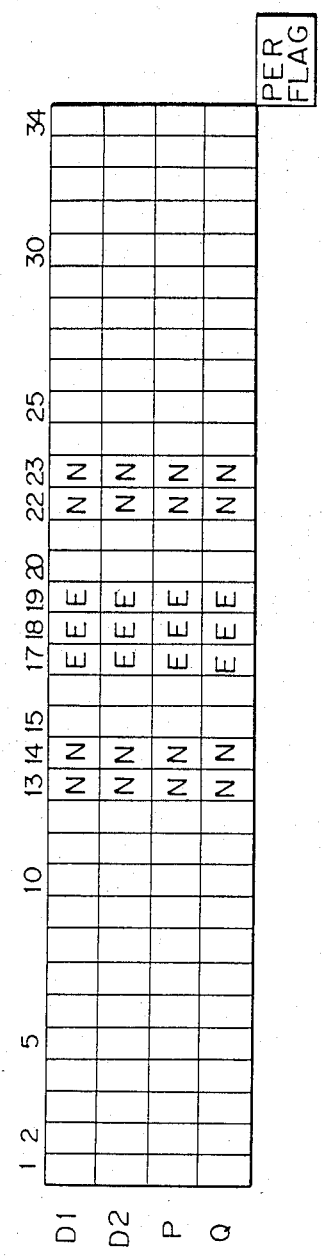

FIG. 5A shows a pointer map as the result of the execution of the processes of [1] to [7]. Namely, according to the invention, in the case where either one of EE, EU, and UE exists as the flags ($F_1$, $F_2$) and ($F_3$, $F_4$) in each data block and at the same time there is one blank in each data block, the pointers of the words are set to N. Thus, as shown in FIG. 5A, the pointers of all words in the 13th, 14th, 22nd, and 23rd data blocks become N. In addition, the pointers of all words in the 17th to 19th data blocks become E.

Figure 5B:
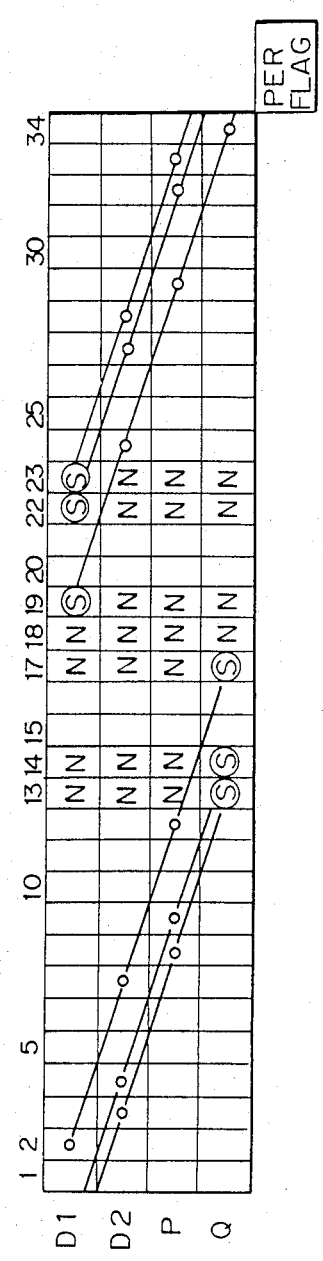

The correcting process of [8] is then performed. FIG. 5B, shows a pointer map after completion of the first correction with regard to the P series. The pointers of the corrected words are written as S. The PER flag is "O". That is, due to the execution of the correcting process of [8], the pointers corrected in the series include no pointer N change from E to S.

Next, the first correction is carried out for the Q series and its pointer map is shown in FIG. 5C. The PER flag is "0".

Further, FIG. 5D shows a pointer map when the second correction was performed for the P series. The PER flag is "0".

Subsequently, the error correction is repeatedly executed with respect to each series. The PER flag is checked when the error correction is finished and when it is "0", the words of the pointers N in the code block are all handled as S.

Figure 6A:
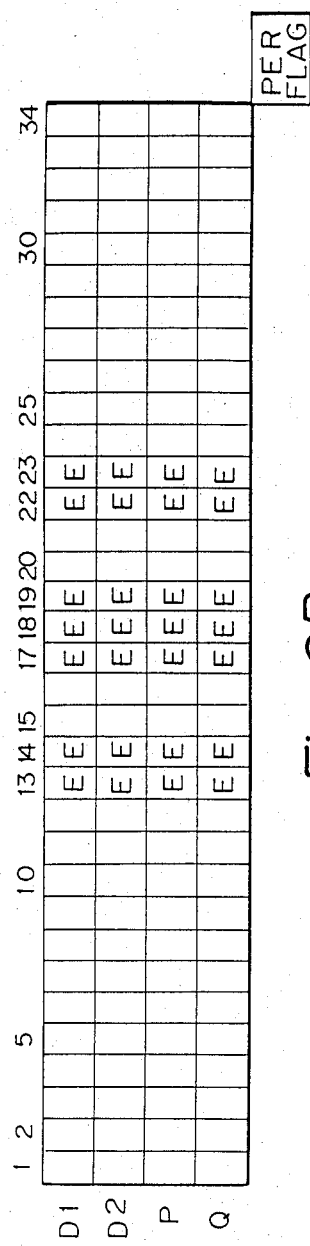
FIGS. 6A to 6D are diagrams showing the states of pointers when the first method in the error correcting methods which have previously been proposed is applied to the flag map shown in FIG. 4.
Figure 6B:
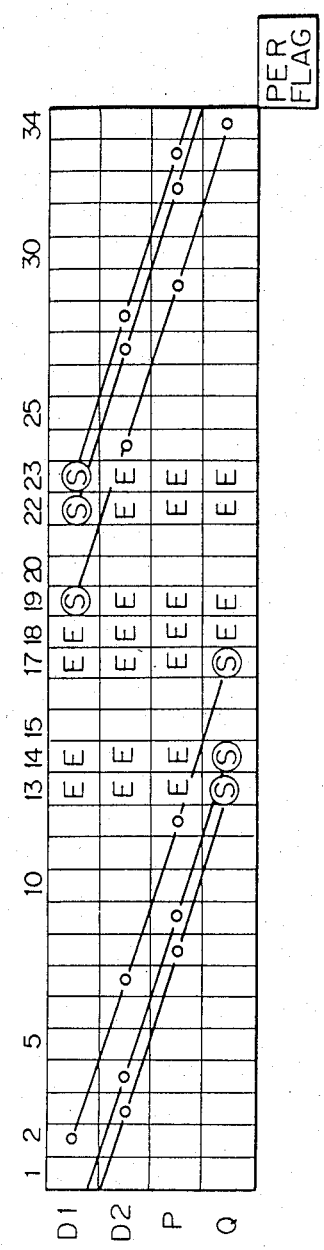

(F) Comparison between the present invention and the first method of the related application With reference to FIGS. 6A to 6C, an explanation will be made with respect to the case where the first method previously proposed is applied to errors similar to those in FIG. 4 for easy understanding of the invention.

According to the first method, when either one of EE, EU, and UE exists as the flags ($F_1$, $F_2$) and ($F_3$, $F_4$) in the data block, the pointers are set to E. Therefore, as shown in FIG. 6A, it is determined that all words in the 13th, 14th, 17th to 19th, 22nd, and 23rd, data blocks have errors and their pointers become E. The correcting processes similar to those in the invention are then executed. FIG. 6B shows a pointer map after completion of the execution of the first correction by the P series. The PER flag is "0".

Figure 6C:
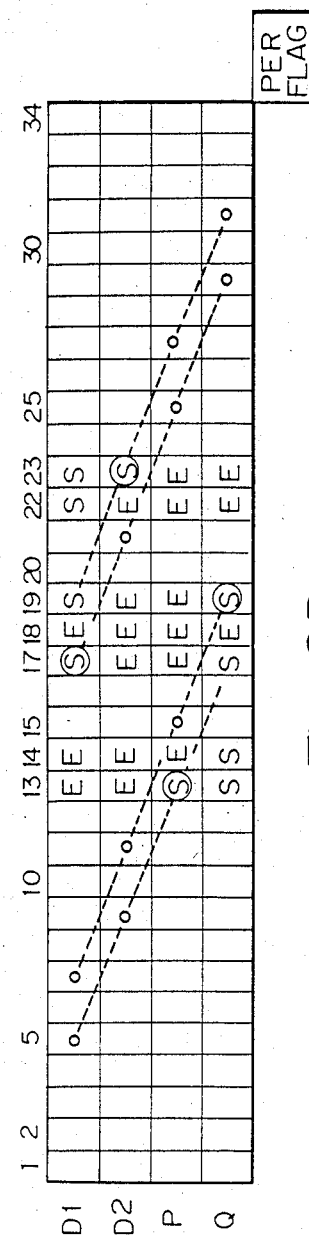

FIG. 6C shows a pointer map after the first correction by the Q series. The PER flag is "0".

Figure 6D:
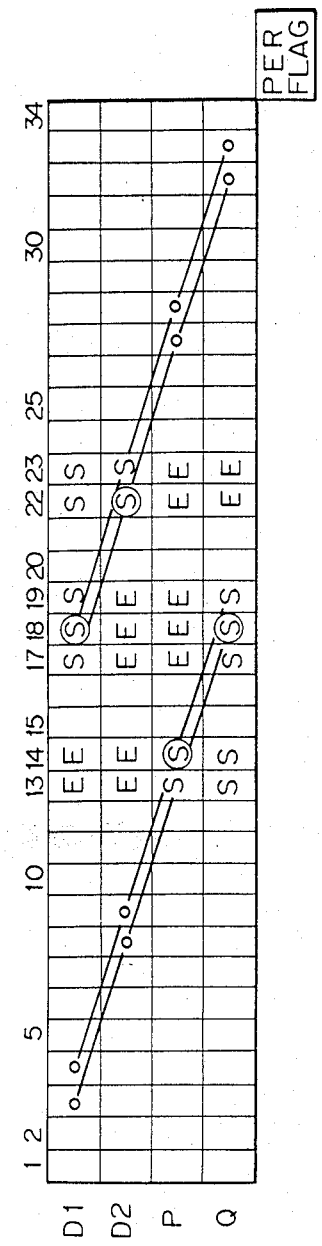

FIG. 6D shows a pointer map after the second correction by the P series. The PER flag is "0".

At this stage, fourteen words are determined to have errors and these words are formed by, e.g., an interpolating process.

(G) Comparison between the present invention and the second method of the related application FIG. 7 shows an example of a flag map different from FIG. 4 which is used for explaining the invention. In this example, CRC errors are detected in the 13th and 17th data blocks and parity errors are detected in the 18th and 22nd data blocks. Further, this example relates to the case where the first word ($D_1$) of the 22nd data block incidentally coincides with the inherent errorless word. In this case, by executing the processes up to [5] in the invention, this flag map is derived.

Figure 8C:
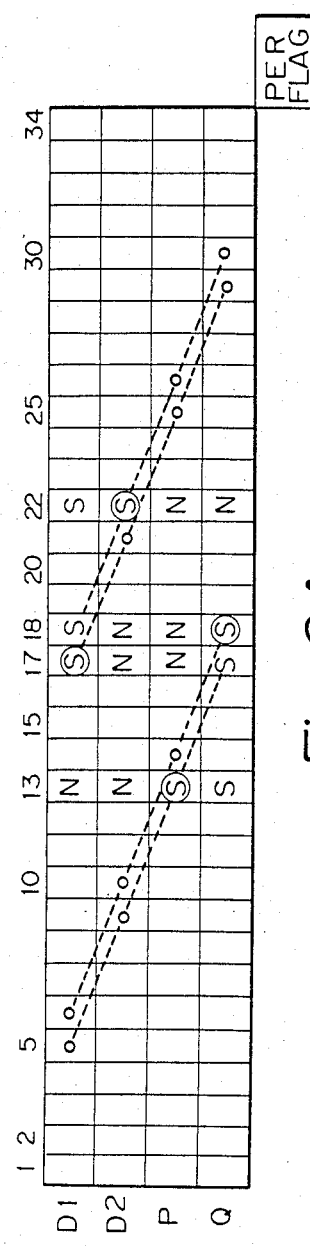

The result of the execution of the process of [7] is shown in a pointer map of FIG. 8A. Symbols written in this pointer map have the same meanings as mentioned above.

In this invention, in the case where either one of EE, EU, and UE exists as the flags ($F_1$, $F_2$) and ($F_3$, $F_4$) in the data block and at the same time at least one blank exists, the pointers are set to N. Therefore, as shown in FIG. 8A, the pointers of all words in the 22nd data block become N.

The correcting process of [8] is then performed. The result of the execution of the first correction of the P series is shown in a pointer map of FIG. 8B. The PER flag is "0".

The first correction of the Q series is then performed and the result is shown in a pointer map of FIG. C. The PER flag is "0". Since the PER flag is "1" at the end of the correction, the words of the pointers N are handled as errors. Therefore, eight words of the pointers N are subjected to an interpolating process.

Figure 9A:
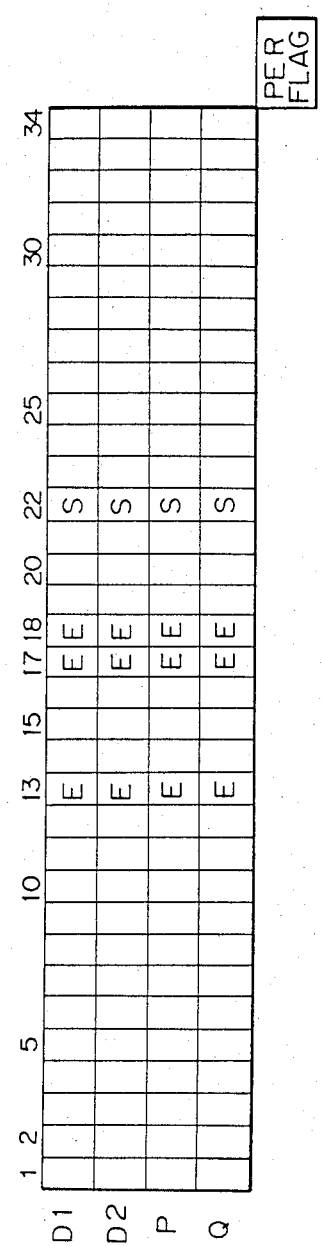
FIGS. 9A to 9C are diagrams showing the states of pointers when the second method in the error correcting methods, which have previously been proposed is applied to the flag map shown in FIG. 7.
Figure 9B:
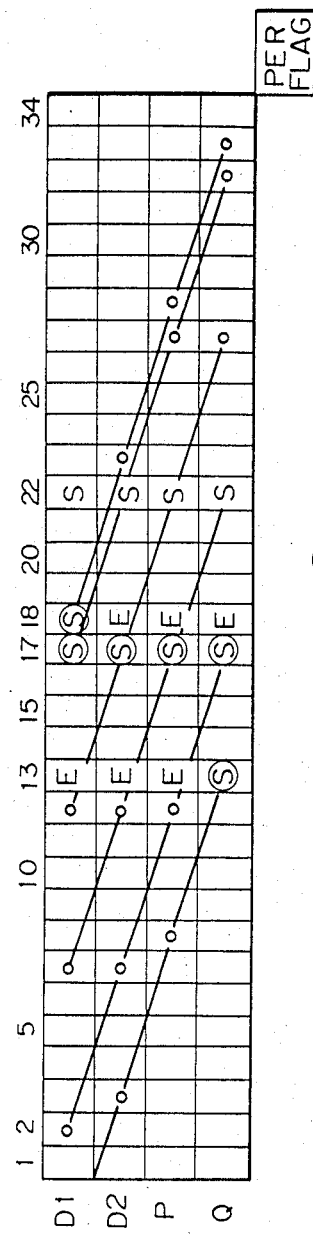

Similarly, with reference to pointer maps of FIGS. 9A to 9C, an explanation will be made with respect to the case where the second method previously proposed is applied to the errors similar to those in FIG. 7.

It is assumed that the PER flag in the second method is set to "1" when a parity error was detected in the P or Q series of the words having the pointers S.

In this example, the first word ($D_1$) is the correct word in the 22nd data block, so that the pointers S are set. As shown in FIG. 9A, therefore, a parity error is overlooked with regard to the other three words.

The correcting process similar to the invention is then executed. FIG. 9B shows a pointer map as the result of the first correction by the P series. The PER flag is "0".

Figure 9C:
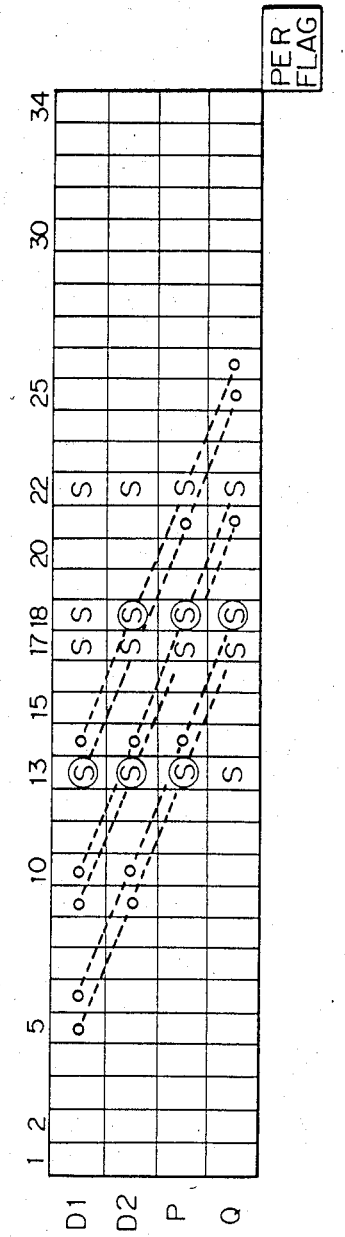

FIG. 9C shows the result of the first correction by the Q series. The PER flag is "1". As will be understood from FIG. 9C, the words of which a parity error was overlooked are regarded as the correct words. Therefore, they are used for correction and the miscorrection increases. Since those miscorrected words are not obviously interpolated, an abnormal noise is generated. In addition, since the PER flag is "1", it is necessary to again perform the correction.

The present invention is not limited to the foregoing embodiment but many modifications and variations are possible within the spirit and scope of the appended claims of the invention.

I claim as my invention:

1. A method for detecting error words in a data block formed by a plurality of words each consisting of a predetermined number of bits of a digital signal, a predetermined number of bits of the data block forming a matrix of a code block, each data block having first error check code, a scond error check code produced by one series in the matrix of the code block, and a third error check code produced by another series in the matrix of the code block, the improvement for detecting the missing error words by the first error check code comprising the steps of:

executing an error check in each data block by use of the first error check code and setting an error pointer to all the words in the data block when an error is detected; and executing an error check in each data block in which no error is detected by the first error check code, using the second error check code and the third error check code, providing one of three additional pointers for each word of said data block, corresponding to correct, wrong and neutral conditions of correctness, in case that no error is found to exist in the data block, setting said correct pointer to all the words in the data block, in case that one or more words determined to have errors exist in the data block and also no error-free word is found to exist in the data block, setting said wrong pointer to all the words in the data block, and in case that one or more words determined to have errors exist in the data block and also one or more error-free words are found to exist in the data block, setting a neutral pointer to all the words in the data block, the neutral pointer designating words which may or may not be correct.

2. The method of claim 1, wherein the first error check code is a CRC code.

3. The method of claim 2, wherein the second and third error check codes are both Reed-Solomon codes.

4. A method for correcting error words in a code block formed by a predetermined number of data blocks, each data block having a second error check code produced by one series in the matrix of the code block, and a third error check code produced by another series in the matrix of the code block, the words of said block being checked by a first error check code produced by a series of the data block, comprising the steps of:

executing an error check for separating all words in the code block into one of three groups according to correctness, comprising wrong word, correct word, and neutral word groups, said netural word groups comprising words which may or may not be correct;

executing error correction repeatedly by use of said second and third check codes, whereby a wrong word or a neutral word corrected with only a correct word is grouped as a correct word and a wrong word corrected with a neutral word is grouped as a neutral word.

5. The method of claim 4, wherein the error correction comprises the steps of:

providing a wrong pointer, a correct pointer and a neutral pointer for designating said three groups, setting said wrong pointer to all the words in the each data block when an error is detected in the data block by the first error check code; and, for each data block containing an error-free word, as detected by the first error check code, when an error is detected by use of the second and third check code, setting the correct pointer to all words in the data block when the one word determined to have error is found to exist in the data block, setting wrong pointer to all the words in the data block when one or more words determined to have errors exist in the data block and also no error-free word is found to exist in the data block, and setting the neutral pointer to the error pointer when one or more words determined to have errors exist in the data block and also one or more words determined to be correct exist in the data block.

6. A method of claim 5 further comprising the step of:

in the case where an error is detected at least once except for a word designated by the wrong pointer when the error correction is performed with respect to each of the second and third word series, setting the wrong pointer to all the words in the data block including the error word when the neutural pointer is set to a word in the data block.

* * * * *

UNITED STATES PATENT AND TRADEMARK OFFICE
CERTIFICATE OF CORRECTION

PATENT NO. : 4,726,028

DATED : February 16, 1988

INVENTOR(S) : Takuji Himeno

It is certified that error appears in the above—identified patent and that said Letters Patent is hereby corrected as shown below:

Claim 5, line 27, change "the one" to --no--;
line 33, change "the error pointer" to --all words in the data block--.

Signed and Sealed this

Twenty-eighth Day of November 1989

Attest:

JEFFREY M. SAMUELS

Attesting Officer     Acting Commissioner of Patents and Trademarks